TRANSISTORIZED AIRPORT CONTROL TOWER CONSOLE

Filed Aug. 5, 1965 2 Sheets-Sheet 1

INVENTOR.
JOSEPH E. PURSLEY
BY Harry A. Herbert Jr. and
Julian L. Siegel
ATTORNEYS

TRANSISTORIZED AIRPORT CONTROL TOWER CONSOLE

Filed Aug. 3, 1965 2 Sheets-Sheet 2

INVENTOR.
JOSEPH E. PURSLEY
BY Harry A. Herbert Jr. and
Julian L. Siegel
ATTORNEYS

United States Patent Office 3,394,311
Patented July 23, 1968

3,394,311

TRANSISTORIZED AIRPORT CONTROL TOWER CONSOLE

Joseph E. Pursley, U.S. Air Force, 2183-3 Comm. Det., APO New York, CMR Box 565 09115

Filed Aug. 3, 1965, Ser. No. 477,049
3 Claims. (Cl. 325—21)

ABSTRACT OF THE DISCLOSURE

An airport control console in which each transmit-receive channel has a transmit-receive relay which, when energized, connects a microphone and a keying voltage through the secondary of a transformer to the transmitter and disconnects the receiver from the speaker.

The invention described herein may be manufactured and used by or for the United States Government for governmental purposes without payment to me of any royalty thereon.

This invention relates to an airport control tower console, and more particularly to a compact console having low power requirements.

The invention shows a novel control console which can be used on a permanent basis or it can be readily adapted to replace an existing console for emergency purposes or for overhaul. The power requirement is only a fraction of that being used by the existing equipment. It can be powered by battery as well as line current and can also be adapted for field combat use. This invention also has the advantages of a compactness and ruggedness, and there is very little maintenance required. It can easily be connected in parallel with other equipment and can be connected for recording. One particular feature of the present embodiment of this invention is the use of only two power supplies for all channels on both the transmit and receive circuits, whereas with the control consoles in present use it is necessary to provide one power line for each channel in the receive circuit, one power line to actuate the keying relays within the console, one power line to provide transmitter keying voltage, and one power line to provide the necessary microphone amplifier voltages. The power requirement has been reduced from the kilowatt range required in the equipment of the present use to the watt range of this invention. In addition to reducing the number of power lines necessary to operate the equipment, this invention provides miniaturization of the power lines used. When airport control systems are in need of overhaul, a mobile tower is needed but such a device is not needed with this invention.

It is therefore an object of this invention to provide an airport control console having the features of small size, low power and readily connected in parallel with other equipment.

It is another object to provide a control console which eliminates the need for a mobile control tower during scheduled overhaul.

These and other advantages, features and objects of the invention will become more apparent from the following description taken in connection with the illustrative embodiments in the accompanying drawings, wherein.

Figure 1:
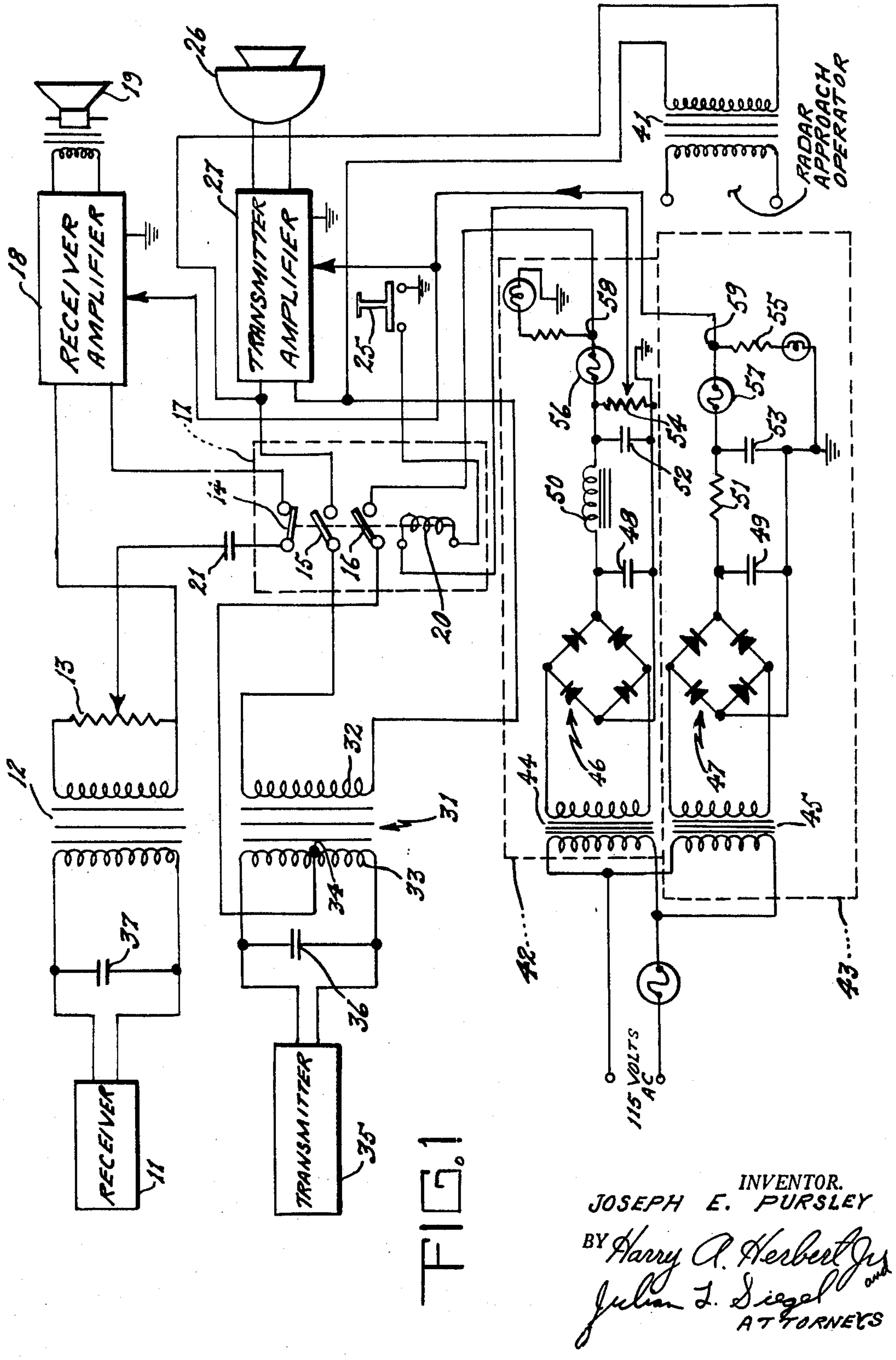
FIG. 1 shows a circuit diagram of a single channel of the control console.

Referring to FIG. 1, which shows only that part of the apparatus which applies to a single channel of the receive and transmit circuits, the same plan can be followed for each additional channel and can accommodate any number of receive and transmit channels. The audio signal is picked up at receiver site 11, transmitted over a telephone pair, and passed through line matching transformer 12. The signal is then passed through audio input attenuator 13 for volume control, through D.C. blocking capacitor 21, through normally closed trip circuit or switch 14 of transmit/receive relay 17, to transistorized audio amplifier 18. The low impedance output stage of the audio amplifier 18 permits direct output to speaker 19 without the use of an audio transformer.

Voice transmission from the tower is affected by depressing transmit key 25 on the console. This allows current to flow through coil 20 which is the energizing means of relay 17. At this point the current causes the normally closed receive trip circuit or switch 14 of relay 17 to open, muting receiver amplifier 18 and causing closing of the normally open switch 15 and normally open transmit keying switch 16 of relay 17.

Voice impulses are picked up by microphone 26, amplified by microphone amplifier 27, and transmitted through now closed switch 15 of relay 17 to primary 32 of transmit line matching transformer 31. The double action of the transformer causes the same signal to appear instantaneously across secondary 33 of transformer 31 which is connected to transmitter 35. Transmitter 35 is adapted to be keyed and modulated from an external source. Keying of the transmitter is effected by a D.C. potential which passes through closed transmit keying switch 16 of relay 17 to center tap 34 of secondary 33 of transformer 31, through the telephone pair to the transmitter 35. This is a simplex circuit or a circuit used to transmit two signals simultaneously. Capacitor 36 as well as capacitor 37 are used as surge suppressors.

At the same time the voice is amplified by transmitter amplifier 27, it can also be fed in parallel arrangement to a radar approach operator of any other local party via line matching transformer 41.

In the present embodiment power supply 42 is used to provide a D.C. potential of 26 volts for activation of transmit/receive relay 17 and at the same time to provide D.C. potential of the range 48 to 55 volts for keying transmitter 35. 115 volts A.C. is fed to transformer 44 and then is full wave rectified by diode bridge rectifier 46. The ripple is filtered by capacitors 48 and 52, choke 50, and resistor 52. The supply for keying transmitter 35 is taken from point 58 through fuse 56. Power to activate relay 17 is taken from resistor 54 which serves as a potentiometer. It is adjusted until relay 17 just activates while depressing key 25.

Power supply 43 provides D.C. potential of 15 volts to operate all transmit and receive amplifiers. 115 volt A.C. is fed to transformer 45 and then is full wave rectified by diode bridge rectifier 47. The ripple is filtered by capacitor 49 and 53 and resistors 51 and 55 and the supply for the amplifiers is taken from point 59 and is protected by fuse 57.

Figure 2:
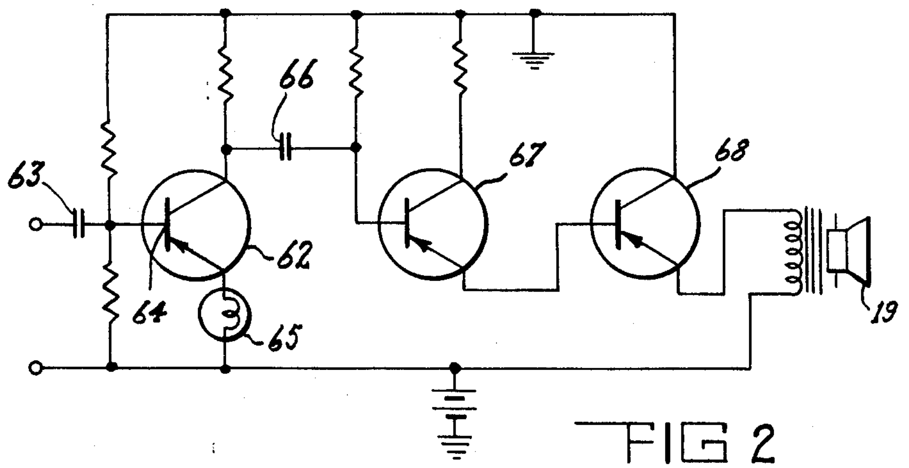
FIG. 2 shows a circuit diagram of the receiver amplifier.
Figure 3:
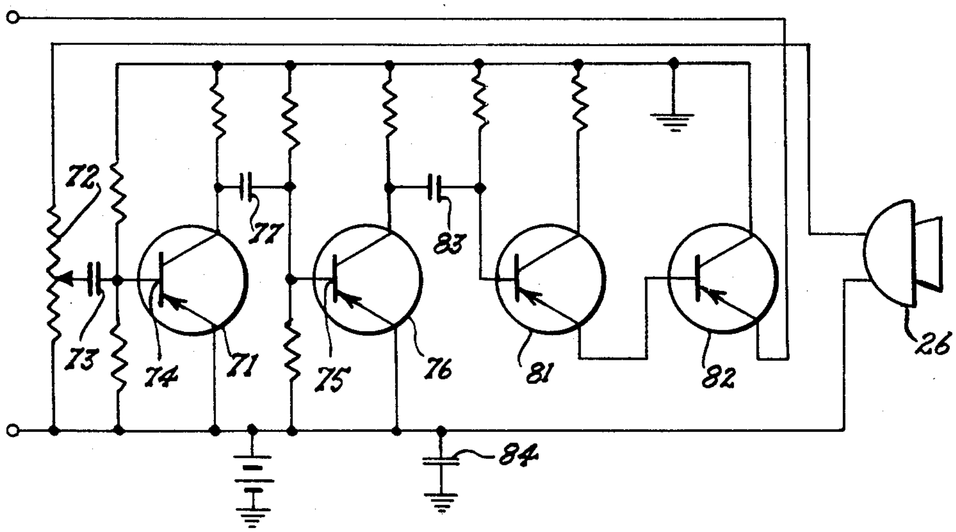
FIG. 3 shows a circuit diagram of the microphone amplifier.

FIGS. 2 and 3 show detail circuits than can be used for receiver amplifier 18 and transmitter amplifier 27 respectively. Other amplifier circuits can be used as well.

The incoming voice signal is coupled to base 64 of transsistor 62 via coupling capacitor 63. Lamp 65 is used as a swamping resistor or thermistor. The signal is then coupled to transistors 67 and 68 via coupling capacitor 66 and speech is produced at speaker 19.

In transmitting the signal from microphone 26 is fed to base 74 of transistor 71 via potentiometer 72 and coupling capacitor 73. The signal is then coupled to base 75 of transistor 76 via coupling capacitor 77. It is then coupled to transistors 81 and 82 via coupling capacitor 83. Capacitor 84 is used to stabilize the power supply.

What is claimed is:

1. A console control system comprising:

(a) a relay including an energizing circuit, a normally closed trip circuit, a first normally open trip circuit, a second normally open trip circuit;

(b) a receiver amplifier;

(c) a signal source for feeding into the receiver amplifier through the normally closed trip circuit, the circuit being opened upon activation of the energizing circuit;

(d) a microphone for producing a modulating signal;

(e) a transmitter amplifier connected to the microphone;

(f) transmitting means connected to the transmitter amplifier through the first normally open trip circuit, the circuit being closed upon activation of the energizing circuit allowing modulation of the transmitter;

(g) means for keying the transmitter by applying a D.C. potential through the second normally open trip circuit;

(h) a first power supply for supplying power to the energizing circuit and to the keying means, the keying means being connected to the first power supply; and (i) a second power supply for the receiver amplifier and the transmitter amplifier.

2. A console control system according to claim 1 which further comprises a line matching transformer having a secondary coil interposed between the transmitting means and the relay, the secondary coil receiving a modulating signal by induction and the D.C. keying potential by simplexing.

3. A console control system according to claim 1 which further comprises a local output being connected to the mcirophone in parallel arrangement.

References Cited

UNITED STATES PATENTS

| | | | |
|---|---|---|---|
| 2,243,719 | 5/1941 | Peterson | 325—144 |
| 2,248,746 | 7/1941 | Davis | 325—22 X |
| 2,265,056 | 12/1941 | Bowers | 325—55 |
| 2,706,242 | 4/1955 | Rawson | 343—180 X |
| 3,059,184 | 10/1962 | Germain | 325—21 |

ROBERT L. GRIFFIN, *Primary Examiner.*

B. V. SAFOUREK, *Assistant Examiner.*